United States Patent
Shimizu

(10) Patent No.: US 6,954,725 B2
(45) Date of Patent: Oct. 11, 2005

(54) MULTI-PHYSICS ANALYSIS METHOD, METHOD FOR SETTING ANALYSIS CONDITIONS THEREFOR, AND STORAGE MEDIUM

(75) Inventor: Koichi Shimizu, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 666 days.

(21) Appl. No.: 09/864,187

(22) Filed: May 25, 2001

(65) Prior Publication Data

US 2002/0072891 A1 Jun. 13, 2002

(30) Foreign Application Priority Data

Dec. 12, 2000 (JP) ........................................ 2000-377072

(51) Int. Cl.[7] .............................................. G06F 7/48
(52) U.S. Cl. ................................................ 703/6; 703/7
(58) Field of Search ............................. 703/2, 6, 7, 11; 702/14; 700/97; 716/5; 706/45; 715/771, 773, 779, 792, 810–845, 964, 970

(56) References Cited

U.S. PATENT DOCUMENTS

| | | | | |
|---|---|---|---|---|
| 5,940,309 | A | * | 8/1999 | White et al. ............... 703/7 |
| RE36,602 | E | * | 3/2000 | Sebastian et al. ......... 700/97 |
| 6,327,537 | B1 | * | 12/2001 | Ikelle ..................... 702/14 |
| 6,370,491 | B1 | * | 4/2002 | Malthe-sorenssen et al. .. 703/2 |
| 6,477,518 | B1 | * | 11/2002 | Li et al. .................. 706/45 |
| 6,526,550 | B1 | * | 2/2003 | Badding et al. ............ 716/5 |
| 2002/0002447 | A1 | * | 1/2002 | Keane .................... 703/11 |

FOREIGN PATENT DOCUMENTS

| | | |
|---|---|---|
| JP | 8-292974 | 11/1996 |
| JP | 8-327725 | 12/1996 |

* cited by examiner

*Primary Examiner*—Kevin J. Teska
*Assistant Examiner*—Kandasamy Thangavelu
(74) *Attorney, Agent, or Firm*—Staas & Halsey LLP

(57) ABSTRACT

Disclosed is a method for setting analysis conditions for multi-physics analysis for analyzing an object model with a plurality of different types of physical simulation models. The method comprises the step of; setting the physical models for element groups constituting the object model; searching boundaries in the object model corresponding to the set element groups; reflecting the physical models of the element groups at the boundaries on a screen for setting analysis conditions for the boundaries; and setting analysis conditions for the boundaries on the screen for the reflected boundaries. Using the principle that a group and the boundaries of that group share the common properties of a physical model, the boundaries corresponding to a group are automatically searched and its analysis conditions are set on a screen when the physical models are set, so that the correlation between the group and the boundaries is reflected on a screen.

13 Claims, 21 Drawing Sheets

FIG. 19

```
                                              116
                    ┌─────────────────────────────┐
                    │ Variable set for heat-fluid analysis │
                    ├─────────────────────────────┤
                    │ Heat conduction rate  ┌────┐ │
                    │         (W/m-K)       └────┘ │
                    │ Specific heat (J/kg-K)┌────┐ │
                    │                       └────┘ │
                    │ Viscosity coefficient ┌────┐ │
                    │         (kg/m-s)      └────┘ │
                    │ Mass density (kg/m³)  ┌────┐ │
                    │                       └────┘ │
                    │         :                    │
                    └─────────────────────────────┘
```

FIG. 20

```
                                              126
                    ┌─────────────────────────────┐
                    │ Variable set for heat-fluid analysis │
                    ├─────────────────────────────┤
                    │ Heat flux (W/m²)      ┌────┐ │
                    │                       └────┘ │
                    │ Heat transmission rate┌────┐ │
                    │         (W/m² -K)     └────┘ │
                    │ Pressure (pascal)     ┌────┐ │
                    │                       └────┘ │
                    │ Flow rate (m/s)       ┌────┐ │
                    │                       └────┘ │
                    │         :                    │
                    └─────────────────────────────┘
```

| | HEAT CONDITION | FLUID | STRUCTURAL ANALYSIS | ELECTROSTATIC MAGNETIC FIELD | ELECTRO-MAGNETIC FIELD | ... |
|---|---|---|---|---|---|---|
| GROUP 1 | ○ | ○ | | | | |
| GROUP 2 | ○ | ◎ | | | | |
| GROUP 3 | ○ | | | | | |
| GROUP 4 | ○ | | | | | |

— MOVING ELEMENT GROUP

| | HEAT CONDITION | FLUID | STRUCTURAL ANALYSIS | ELECTROSTATIC MAGNETIC FIELD | ELECTRO-MAGNETIC FIELD | ... |
|---|---|---|---|---|---|---|
| BOUNDARY 1 | ○ | ○ | | | | |
| BOUNDARY 2 | ○ | ○ | | | | |
| BOUNDARY 3 | ○ | ◎ | | | | |
| BOUNDARY 4 | ○ | | | | | |

— MOVING BOUNDARY

| PHYSICAL MODEL | FLUID | HEAT | STRUCTURE | ELECTRO-MAGNETIC FIELD | ETC |
|---|---|---|---|---|---|
| GROUP 1 | ◎ | | | | |
| GROUP 2 | | | ○ | | |
| ⋮ | | | | | |
| BOUNDARY 1 | ○ | | | | |
| BOUNDARY 2 | ◎ | | ◎ | | |

| PHYSICAL MODEL | FLUID | HEAT | STRUCTURE | ELECTRO-MAGNETIC FIELD | ETC |
|---|---|---|---|---|---|
| GROUP 1 | | | | ○ | |
| GROUP 2 | | ○ | ○ | ○ | |
| ⋮ | | | | | |
| BOUNDARY 1 | | | | ○ | |
| BOUNDARY 2 | | ◎ | ◎ | ◎ | |
| BOUNDARY 3 | | | | ○ | |

MULTI-PHYSICS ANALYSIS METHOD, METHOD FOR SETTING ANALYSIS CONDITIONS THEREFOR, AND STORAGE MEDIUM

BACKGROUND OF THE INVENTION

1. Field of the Invention

The present invention relates to a multi-physics analysis method, method for setting analysis conditions thereof, and storage medium, for analyzing an object model using various types of physical simulation models, and more particularly to a multi-physics analysis method, method for setting analysis conditions thereof, and storage medium, for setting analysis conditions for an object model.

2. Description of the Related Art

In recent years, it has become common to study design models by simulating the physical motion of the design model using a computer, which is exemplified heat conduction analysis, fluid analysis, structural analysis, electromagnetic field analysis, electromagnetic wave analysis, and so forth. In recent years, as the object models to be analyzed have become more complex, the instances of applying multiple types of simulations to an object model have increased. This is called multi-physics analysis.

FIG. 25 is a drawing to explain the conventional analysis method; FIG. 26 is a drawing to explain the conventional procedures for setting analysis conditions; FIG. 27A and FIG. 27B are drawings to explain examples of the object model. As shown in FIG. 25, data for the model are generated with a CAD system. For example, this is the model in FIG. 27A.

The analysis system reads this data (generally, the data are in an unstructured format). Before analysis, the physical simulation model (to be referred to as physical model) is selected and then the analysis conditions for each element group of the object model and the analysis conditions for the boundaries of the element groups are set. After the analysis conditions are set in this way, the analysis calculations are performed.

A specific explanation is made with the model example in FIG. 27A. FIG. 27A shows the basic outline of a model for thermal-hydraulic analysis. Group 1, an assembly of model elements, is the region of fluid within the housing; group 2 is an exothermic body; and group 3 is an insulating body. Air flows in from the inlet boundary on the left side of the figure and air flows out from the outlet boundary on the right side.

FIG. 27B shows this model divided into elements (mesh). An element group is an assembly of elements and a boundary is an assembly of contiguous element boundaries. A boundary may extend across a plurality of element groups and does not necessarily exist at the boundary of an element group. In FIG. 27B, the boundaries 2 and 4 are walls of the fluid, the boundary 5 is the wall of the insulating body, the boundary 1 is the boundary of the inlet, the boundary 3 is the boundary of the outlet, the boundary 6 is the boundary between the insulating body and the fluid, and boundary 7 is the boundary between the exothermic body and the fluid.

The analysis conditions are set for these element groups and boundaries. The analysis conditions are the types of analysis and the analyzed properties (heat conduction and so forth). In the case of FIG. 27B, group 1 has the properties of heat conduction and a fluid, and therefore heat conduction and fluid are set as the physical models. Group 2 is a solid exothermic body, and therefore only heat conduction is set as the physical model. Group 3 is an insulating body, and therefore nothing need be set. Furthermore, the properties of the group, such as heat conduction, are set for each group. Likewise, the physical models and properties of the boundaries are set for each boundary shown in FIG. 27B.

These are conventionally set as shown in FIG. 26. The names of the groups and boundaries are displayed in different one-dimensional lists, each group or boundary is selected, and the conditions are set separately for each group and boundary.

However, when two or more physical models are to be analyzed, it is necessary to establish a plurality of physical variables for each element group, and therefore, the operation of setting analysis conditions becomes troublesome if one-dimensional lists are used. Also, when setting boundary conditions, it is necessary to establish the boundary conditions while considering which boundary corresponds to which physical model, as well as the conditions for setting the element groups, and the operation becomes even more complex.

In recent years, object models have become more complex and analysis using a large number of physical models has increased. It has become necessary to establish a large number of groups and boundary conditions, as well as a large number of physical models; the problem is that the work of setting the conditions has become complex and difficult. Also, it is difficult to grasp the situation for setting the groups and boundaries, making the work of setting the conditions even more complex.

Because of the unclear relationship between the groups and boundaries sharing the same original physical model, for example, even though the analysis conditions are set for one group (for example, "solid2") using the physical model for an electrostatic field, the boundary conditions of the same electrostatic field can be applied to the boundary of another group (for example, "solid1").

SUMMARY OF THE INVENTION

Consequently, it is an object of the present invention to provide a multi-physics analysis method, method for setting analysis conditions thereof, and storage medium, for making it easy to establish conditions for groups and boundaries in an object model in a multi-physics analysis system using a plurality of physical models.

It is another object of the present invention to provide a multi-physics analysis method, method for setting analysis conditions thereof, and storage medium, for making it easy to establish conditions for groups and boundaries using the common properties of the physical models of the groups and boundaries in the object model.

It is another object of the present invention to provide a multi-physics analysis method, method for setting analysis conditions thereof, and storage medium, for linking the setting of conditions and the object model on a screen and making it easy to set the conditions.

In order to achieve these objects, a multi-physics analysis method relating to the present invention comprises: a step for setting the physical model for element groups constituting the object model; a step for searching boundaries in the abovementioned object model corresponding to the abovementioned set element groups; a step for reflecting the physical models of the abovementioned element groups at the found boundaries on a screen for setting analysis conditions for the boundaries of the abovementioned object model; a step for setting analysis conditions for the abovementioned boundaries on a screen for setting analysis conditions for the abovementioned reflected boundaries; and a step for analyzing the abovementioned object model with the abovementioned set physical models and analysis conditions.

The method for setting analysis conditions in the multi-physics analysis relating to the present invention comprises: a step for setting the physical models for the element groups constituting the abovementioned object model; a step for searching the boundaries of the abovementioned object model corresponding to the abovementioned set element groups; a step for reflecting the physical models of the abovementioned element groups at the found boundaries on a screen for setting analysis conditions for the boundaries of the abovementioned object model; and a step for setting analysis conditions for the abovementioned boundaries on a screen for setting analysis conditions for the abovementioned reflected boundaries.

A storage medium, for storing a program for setting analysis conditions in the multi-physics analysis relating to the present invention, is stored the following: a program for setting the physical models for the element groups constituting the abovementioned object model; a program for finding boundaries of the abovementioned object model corresponding to the abovementioned set element groups; a program for reflecting the physical models of the abovementioned element groups at the found boundaries on a screen for setting analysis conditions of the boundaries of the abovementioned object model; and a program for setting analysis conditions for the abovementioned boundaries on a screen for setting analysis conditions for the abovementioned reflected boundaries.

Using the principle that a group and the boundaries of that group have the properties of a common physical model, the present invention is constituted so as to reflect the correlation between the groups and the boundaries on a screen for setting boundary conditions. For this reason, when the physical model of a group is set, the boundaries corresponding to that group are automatically searched and the analysis conditions for those boundaries are set on a screen for setting boundary conditions. In the setting of analysis conditions for multi-physics analysis, the element groups and boundaries of an object model are thereby automatically correlated and the setting of the analysis conditions can be performed easily and properly.

In a preferable embodiment of the multi-physics analysis method relating to the present invention, the abovementioned step for setting element groups preferably comprises a step for setting the abovementioned element groups on a screen for setting analysis conditions for element groups that is displayed on the same screen as the screen for setting boundary conditions for the abovementioned boundaries. The relationships are therefore displayed on the same screen, making it easy to understand and establish the analysis conditions properly.

A preferable embodiment of the multi-physics analysis method relating to the present invention preferably further includes a step for displaying the form of the abovementioned object model on the same screen as the abovementioned screen for setting analysis conditions. It therefore becomes possible to set the analysis conditions for groups and boundaries while referring to the form of the object model.

BRIEF DESCRIPTION OF THE DRAWINGS

FIG. 19 is a drawing to explain the screen for setting analysis variables that is another embodiment of the present invention;

FIG. 20 is a drawing to explain the screen for setting boundary conditions that is another embodiment of the present invention;

DESCRIPTION OF THE PREFERRED EMBODIMENTS

The preferred embodiments of the present invention are explained below with reference to the drawings and in the following order: multi-physics analysis system, method for setting analysis conditions, and other embodiments.

Multi-Physics Analysis System

Figure 1:
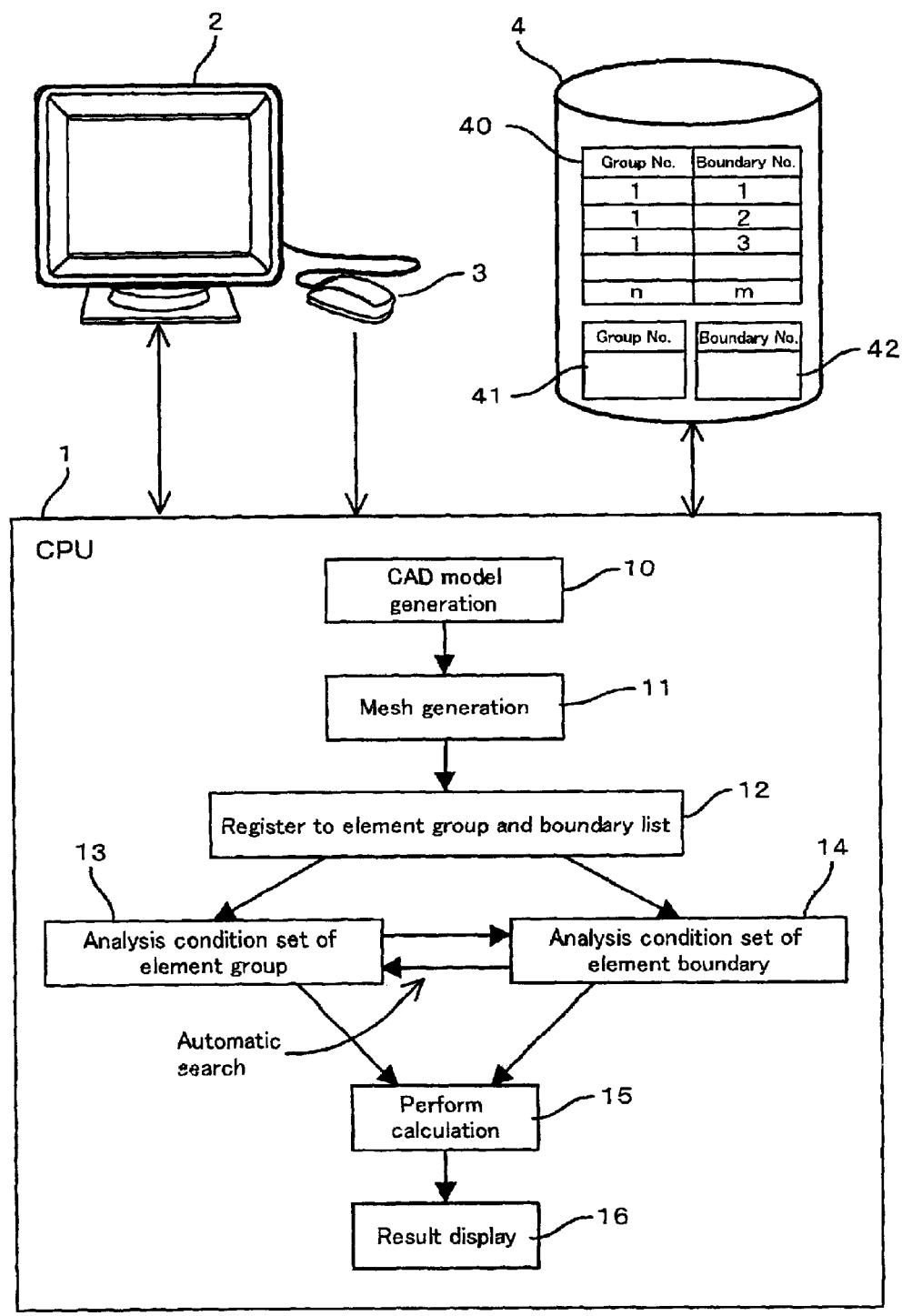
FIG. 1 shows the configuration of the system relating to an embodiment of the present invention.
Figure 2:
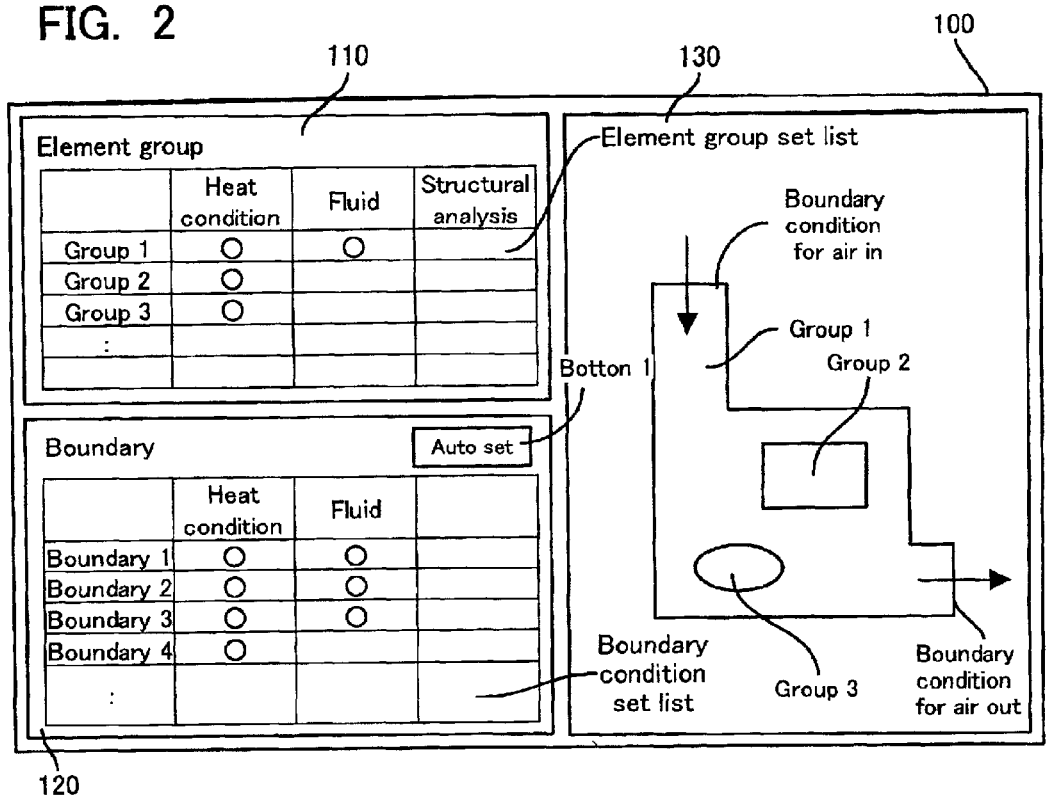
FIG. 2 is a drawing to explain the screen for setting analysis conditions of the system in FIG. 1.
Figure 3:
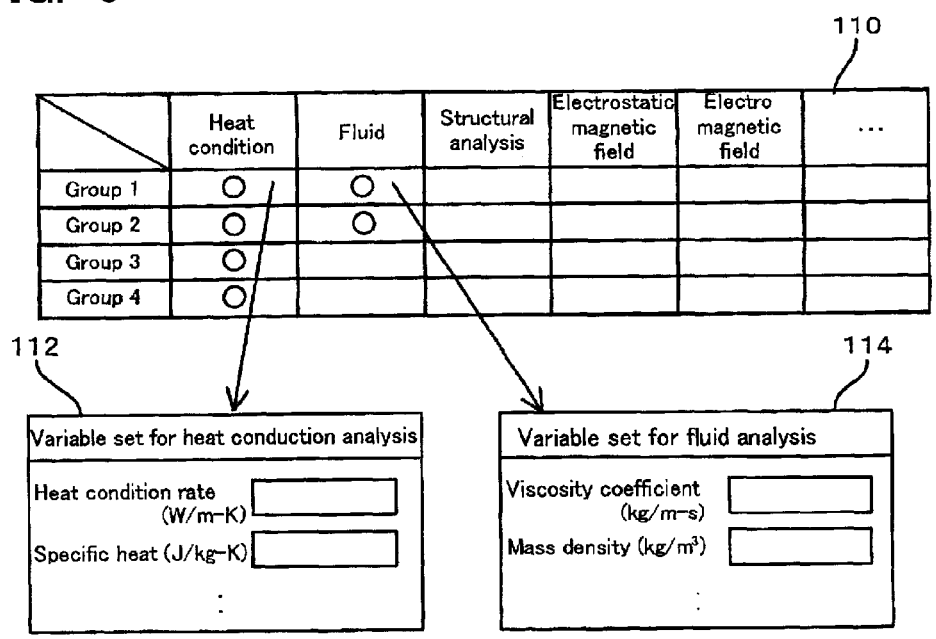
FIG. 3 shows the constitution of the element group list in FIG. 2.
Figure 4:
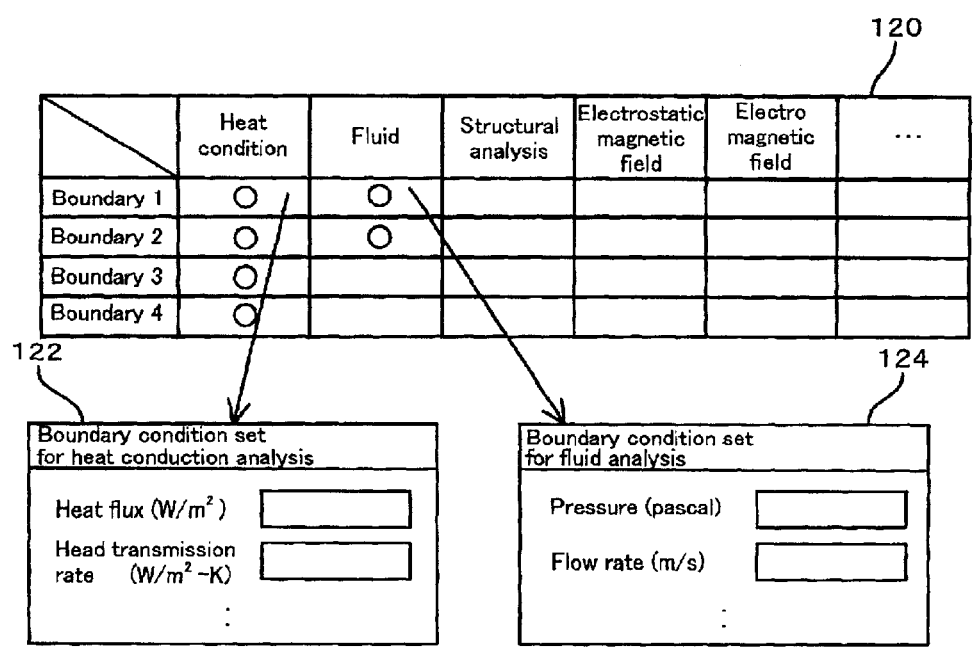
FIG. 4 shows the constitution of the element boundary list in FIG. 2.

FIG. 1 shows the configuration of a multi-physics analysis system that is an embodiment of the present invention; FIG. 2 is a drawing to explain the screen in FIG. 1; FIG. 3 is a drawing to explain the screen for setting analysis conditions for those element groups; and FIG. 4 is a drawing to explain the screen for setting analysis conditions for those boundaries.

As shown in FIG. 1, a multi-physics analysis system comprises a CPU (processor) 1, a display 2, an input device 3 such as a mouse, and a file device (storage device) 4. A well known personal computer can be used as this analysis system.

The CPU 1 performs a CAD model generating process 10, a mesh generating process 11, a list registration process 12, a process 13 for setting analysis conditions for element groups, a process 14 for setting analysis conditions for element boundaries, a process 15 for computing simulation of a physical model, and a process 16 for displaying the computation results. These processes are in the form of modules and some general-purpose modules can be used.

The CAD model generating process 10 generates a model for performing numerical computations. The mesh generating process 11 divides the generated model into meshes (elements). At this time, the groups and boundaries of each mesh (element) are defined.

The list registration process 12 registers the groups in the group list 41 and the boundaries in the boundary list 42, and registers the relationship between the groups and boundaries in the correspondence list 40. The correspondence list 40 is established in the file device 4 in FIG. 1 and contains the group numbers and corresponding boundary numbers.

The process for setting analysis conditions for element groups 13 and the process for setting analysis conditions for element boundaries 14 establish the analysis conditions for the groups and boundaries which have been divided into meshes (elements). For example, in the case of heat conduction analysis, the heat transmission rate is set for an element group and the temperature and heat transmission rate are set for the boundary. Also, in structural analysis, Young's modulus and so forth are set for the element group and conditions such as the load are set for the boundary. One characteristic of the present invention is that both the processes for setting analysis conditions 13 and 14 are linked together.

The processes for setting analysis conditions are explained using FIGS. 2, 3, and 4. FIG. 2 shows a screen 100 for setting analysis conditions on the display 2. The screen 100 for setting analysis conditions has three areas 110, 120, and 130. The first area 110 displays a two-dimensional list of the physical model and element group names. The second area 120 displays a two-dimensional list of the physical model and boundary names. The third area 130 displays the form of the object model.

The two-dimensional list 110 for setting element groups is a table of each element group name and the physical simulation models that can be designated with this system. In the example shown in FIGS. 2 and 3, this list is constituted by a table of the three groups 1, 2, and 3 of the object model (third area 130 in FIG. 2) and the five physical models that can be designated (heat conduction, fluid, structural analysis, electrostatic and magnetic field, electromagnetic field).

The physical model in the two-dimensional list 110 can be selected by clicking (or double clicking) at the area where the physical model and element group intersect. The physical variable input screens 112 and 114 for the corresponding physical model are opened and the variables can be input.

In the example in FIG. 3, the screen 112 for setting the variables for heat conduction analysis is opened by clicking on heat conduction in the two-dimensional list 110 and the heat conduction rate, specific heat, and so forth can be input. Also, by clicking on fluid in the two-dimensional list 110, the screen 114 for setting the variables for fluid analysis is opened and the coefficient of viscosity, mass density, and so forth can be input. A circle is displayed in set columns in the two-dimensional list 110.

The two-dimensional list 120 for setting the boundary conditions is a table of each boundary name and the physical simulation models that can be designated with this system. In the example in FIGS. 2 and 4, this list is constituted by a table of the boundaries 1, 2, 3, and 4 of the object model (third area 130 in FIG. 2) and the five physical models that can be designated (heat conduction, fluid, structural analysis, electrostatic field, electromagnetic field).

To select the boundary conditions in the two-dimensional list 120, the physical variable input screens 122 and 124 of the corresponding physical model are opened by clicking (or double clicking) at the areas where the physical model and boundary intersect, and the variables can be input.

In the example in FIG. 4, the screen 122 for setting the boundary conditions for heat conduction analysis is opened by clicking on heat conduction in the two-dimensional list 120 and heat flux, heat transmission rate, and so forth can be input. Also, the screen 124 for setting the boundary conditions for fluid analysis is opened by clicking on fluid in the two-dimensional list 120 and the pressure, flow rate, and so forth can be input.

One characteristic of the present invention is the function for displaying the two-dimensional list of the physical models and boundary names. The correspondence list 40 of the abovementioned file 4 is referenced and the common situations for the physical model of each element group are displayed in the boundary list 120. In the boundary list 120, boundaries for which conditions must be set (areas where the physical models and boundaries intersect) are automatically checked. For example, these are indicated with a circle. By clicking (or double clicking) the area of the boundary name to be checked, it becomes possible to set the boundary conditions for the physical model corresponding to each boundary.

Also, when the display of the two-dimensional list of the physical models and element group names, the display of the two-dimensional list of the physical models and the boundary names, and the display of the model form are arranged on a single screen and displayed at the same time, it will make it easy to grasp the situation of the analysis settings.

In this way, the use of the two-dimensional list 110 makes it easy to set the physical variables for element groups in a coupled analysis with a plurality of physical models. Also, it is easy to set boundary conditions according to the invention, since the situations of the setting of physical variables for the element groups are determined and the boundary conditions to be set are automatically checked and enable to be set with the boundary list 120. Furthermore, it becomes easy to grasp the situation of the analysis settings because the element group list, boundary list, and model form can be output at the same time.

Referring FIG. 1 again, the computation process 15 performs the computations using the mesh-divided model and the analysis conditions and finds the solution. This computation process 15 can use a general-purpose heat analysis program, structural analysis program, fluid analysis program, and so forth. The process 16 for displaying the results outputs the results of the computations determined in the computation process on the screen.

Figure 5:
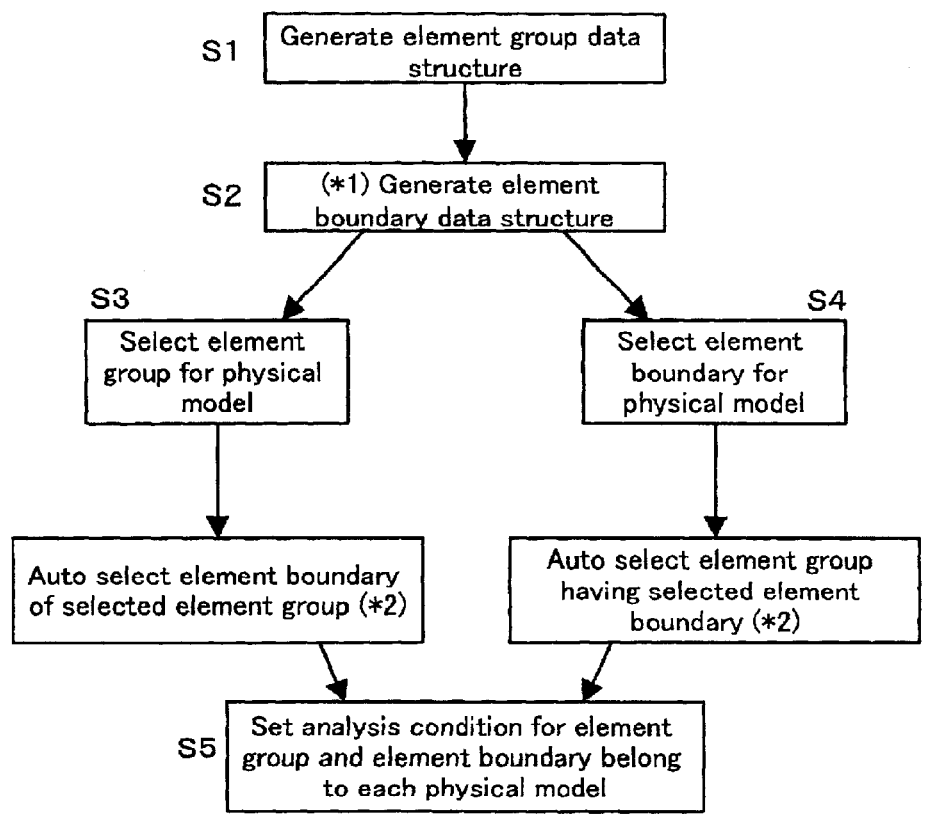
FIG. 5 is a flowchart of the process for setting analysis conditions in FIG. 1.
Figure 6:
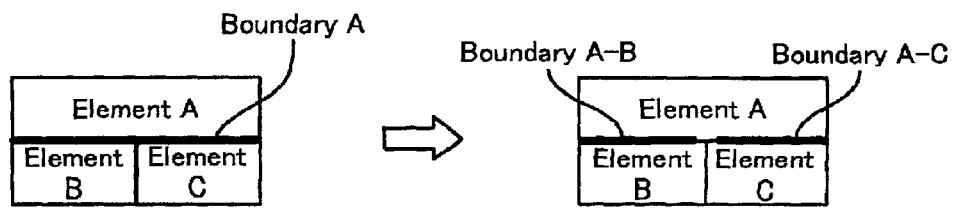
FIG. 6 is a drawing to explain the process of boundary division in FIG. 5.
Figure 7:
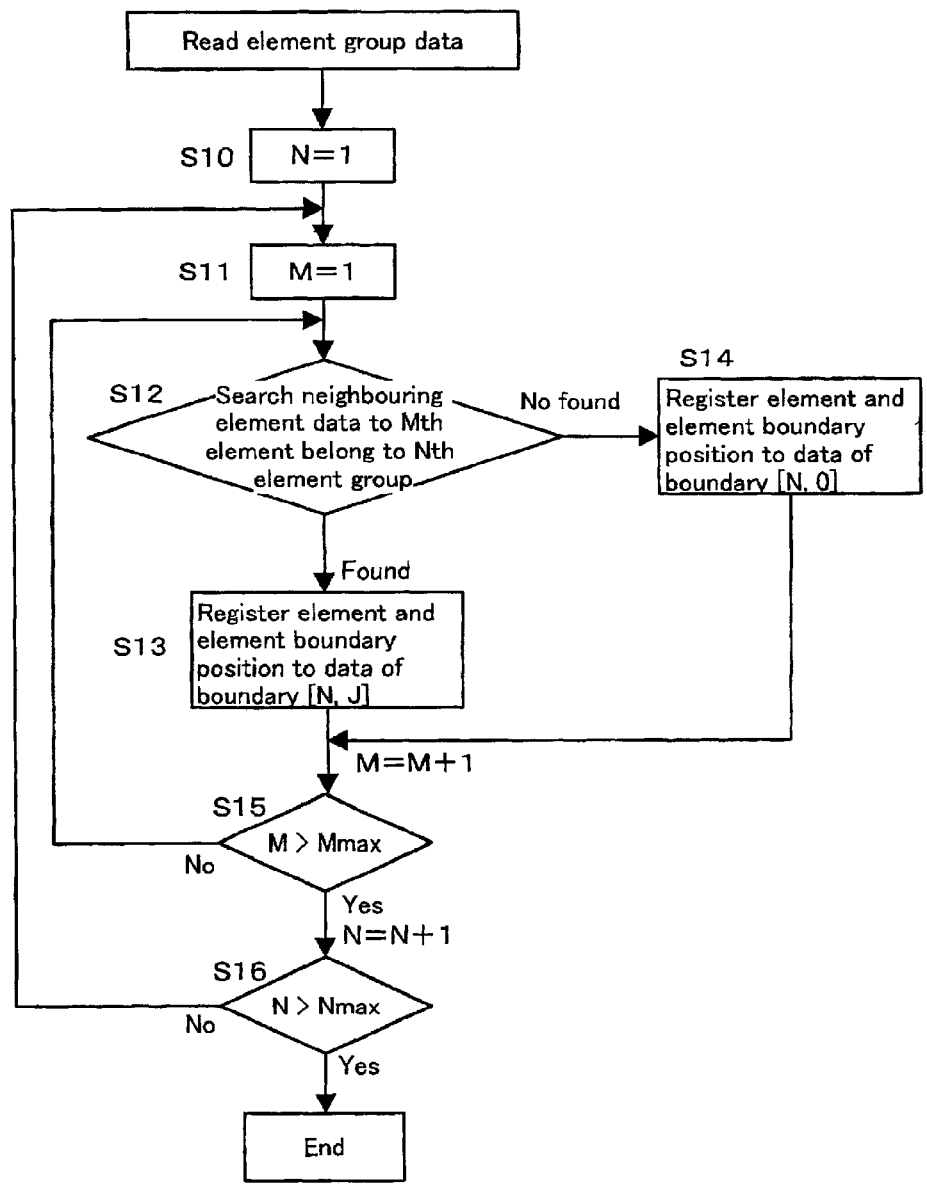
FIG. 7 is a flowchart of the process for detecting boundaries in FIG. 5.
Figure 8:
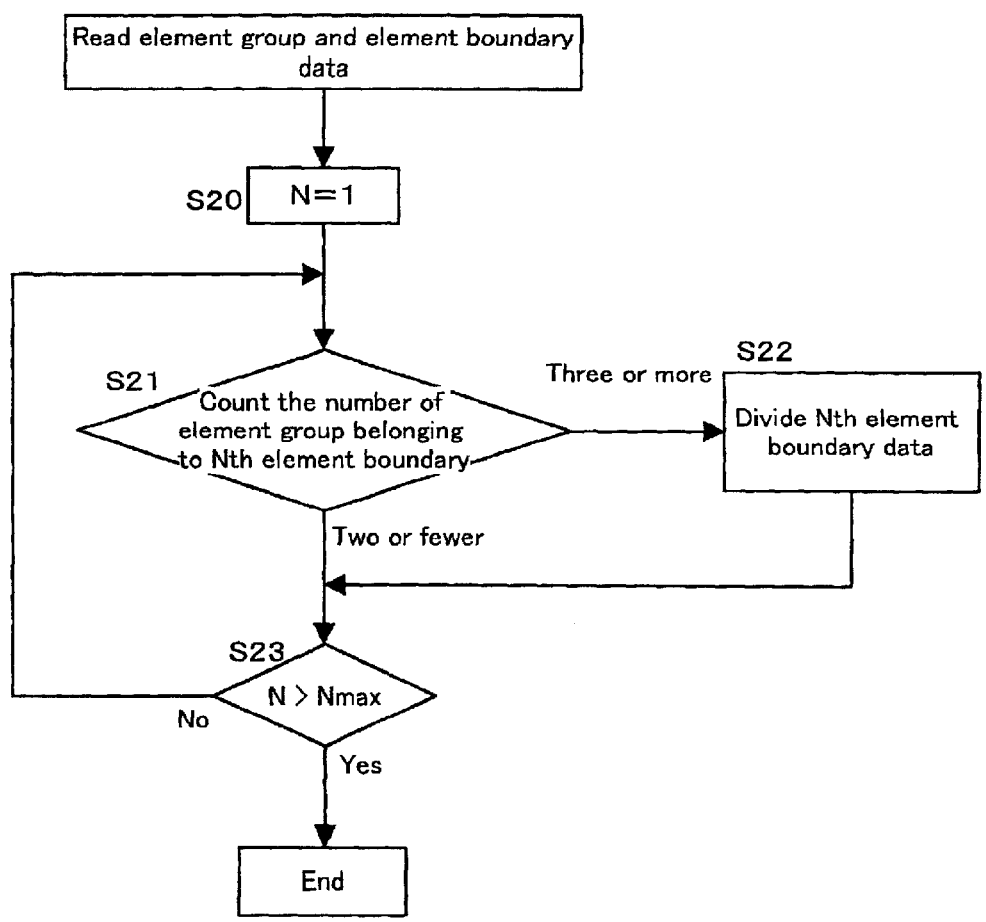
FIG. 8 is a flowchart of the process for correcting boundaries in FIG. 5.
Figure 9:
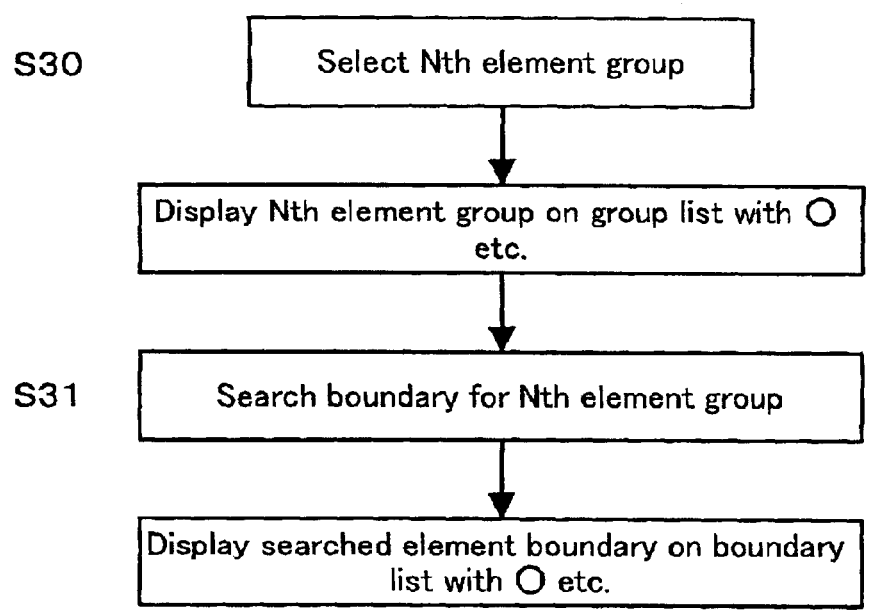
FIG. 9 is a flowchart of the process for linking in FIG. 5.

The list registration process 12 and the processes 13 and 14 for setting boundary conditions will be explained below with reference to FIGS. 5 through 9. FIG. 5 is a flowchart of the list registration process and processes for setting analysis conditions in FIG. 1; FIG. 6 is a diagram showing relation between the elements and boundaries in FIG. 5; FIG. 7 is a flowchart of the process for generating boundary data in FIG. 5; FIG. 8 is a flowchart of the process for correcting boundary data in FIG. 5; and FIG. 9 is a flowchart of the linking process in FIG. 1.

The registration and setting processes are explained with reference to FIG. 5.

(S1) Generate the element group data structure. In the example in FIG. 1, the element groups read in are registered to the group list 41.

(S2) Generate the element boundary data structure from the element groups read in or element groups and element boundary data. As shown in FIG. 6, the boundary A extends over the elements A, B, and C. In such a case, the boundary A is divided into the boundary A-B and the boundary A-C. In this manner, it can be defined that a single boundary has one element on one side or on each side, and it becomes possible to set analysis conditions using the correlation of the boundary and elements. In the example in FIG. 1, this boundary is registered to the boundary list 42 and the correlation of the group and boundary is registered to the correspondence list 40. This process will be explained in detail below with reference to FIGS. 7 and 8.

(S3) The screen 100 for setting analysis conditions is displayed as shown in FIG. 2, and the physical models for the element groups are selected from the two-dimensional list of the element groups and physical models in area 110. This can be performed, as shown in FIGS. 2 and 3, by clicking on the region at the intersection of the group and physical model. In response thereto, the element boundaries of the selected element groups are automatically searched using the correspondence list 40. The physical models of the element boundaries in the two-dimensional list of the element boundaries and physical models in the area 120 are determined to be the physical model that was clicked. This process will be explained in detail later with reference to FIG. 9.

(S4) In the same way, the physical models of the element boundaries are selected from the two-dimensional list of the element boundaries and physical models in the area 120 of the screen 100 for setting analysis conditions, as shown in FIG. 2. As shown in FIGS. 2 and 4, this is performed by clicking on the area at the intersection of the element boundary and physical model. In this manner, the element group bounded by the selected element boundary is automatically searched using the correspondence list 40. The physical model of the element group in the two-dimensional list of element groups and physical models in the area 110 is determined to be the clicked physical model.

(S5) The screens 112, 114, 122, 124 for setting analysis conditions for the various physical models are opened and the analysis conditions are set (input) as shown in FIGS. 3 and 4.

The process for generating boundary data, explained with FIGS. 5 and 6, will be explained with reference to FIG. 7. FIG. 7 shows the process for generating boundary data in the case where only the element group is read in.

(S10) The pointer N of the element group is initialized to "1" after reading in the element group data (element group and elements thereof).

(S11) The element pointer M is initialized to "1".

(S12) For the M-number element belonging to the N-number element group, element data adjacent thereto is searched.

(S13) Register the M-number element and element boundary location to the data for the boundary [N, J] in the case where there is an element adjacent to the element group J.

(S14) Meanwhile, register the M-number element and element boundary location to the data for the boundary [N, 0] in the case where there is no adjacent element.

(S15) Increment the element pointer M to "M+1" and determine whether the element pointer M has exceeded the maximum value Mmax. If not, return to Step S12.

(S16) If the element pointer M exceeds the maximum value, determine whether the element group pointer N exceeds the maximum value Nmax. If not, return to Step S11. If the element group pointer N exceeds the maximum value, end the process because the boundary search for all element groups has been complete. Moreover, the process in FIG. 7 is not necessary in the case where boundary data are provided.

In the following, the process for correcting the boundary data explained with reference to FIG. 6 will be explained using FIG. 8.

(S20) Initialize the element boundary pointer N to "1" after reading in the element group data (element group and its elements) and the element boundary data.

(S21) Count the number of element groups belonging to the N-th element boundary.

(S22) In the case where the number of element groups is 3 or greater, divide the N-th element boundary data into a plurality of items and generate new element boundary data.

(S23) Make no divisions when the number of element groups is two or less. In other words, when the number of element groups is two or less, and when the number of element groups is corrected to two or less in Step S22, determine whether the element boundary pointer N exceeds the maximum value Nmax. If not, return to Step S21. If the pointer N exceeds the maximum value, end the process because the processing of element boundaries has been complete.

In this way, a single boundary can be defined as having one element on one side or as having an element on each side and it becomes possible to set analysis conditions using the correlation of the boundary and elements.

Next, the process for linking the element groups and boundary in the condition setting process in FIG. 5 is explained using FIG. 9.

(S30) Indicate the N-th element group with a circle in the group list 110 when the physical model for the N-th element group is selected from the two-dimensional list 110 of boundary groups in FIG. 2.

(S31) Refer to the correspondence list 40 and search the boundaries of the selected group. Indicate the boundary elements hit in the search with a circle in the boundary list 120.

In this way, the correspondence of the selected group and boundaries is automatically checked and is reflected in the setting of analysis conditions as explained in FIG. 2.

The method for setting analysis conditions is explained next using FIGS. 10 through 17.

Figure 10:
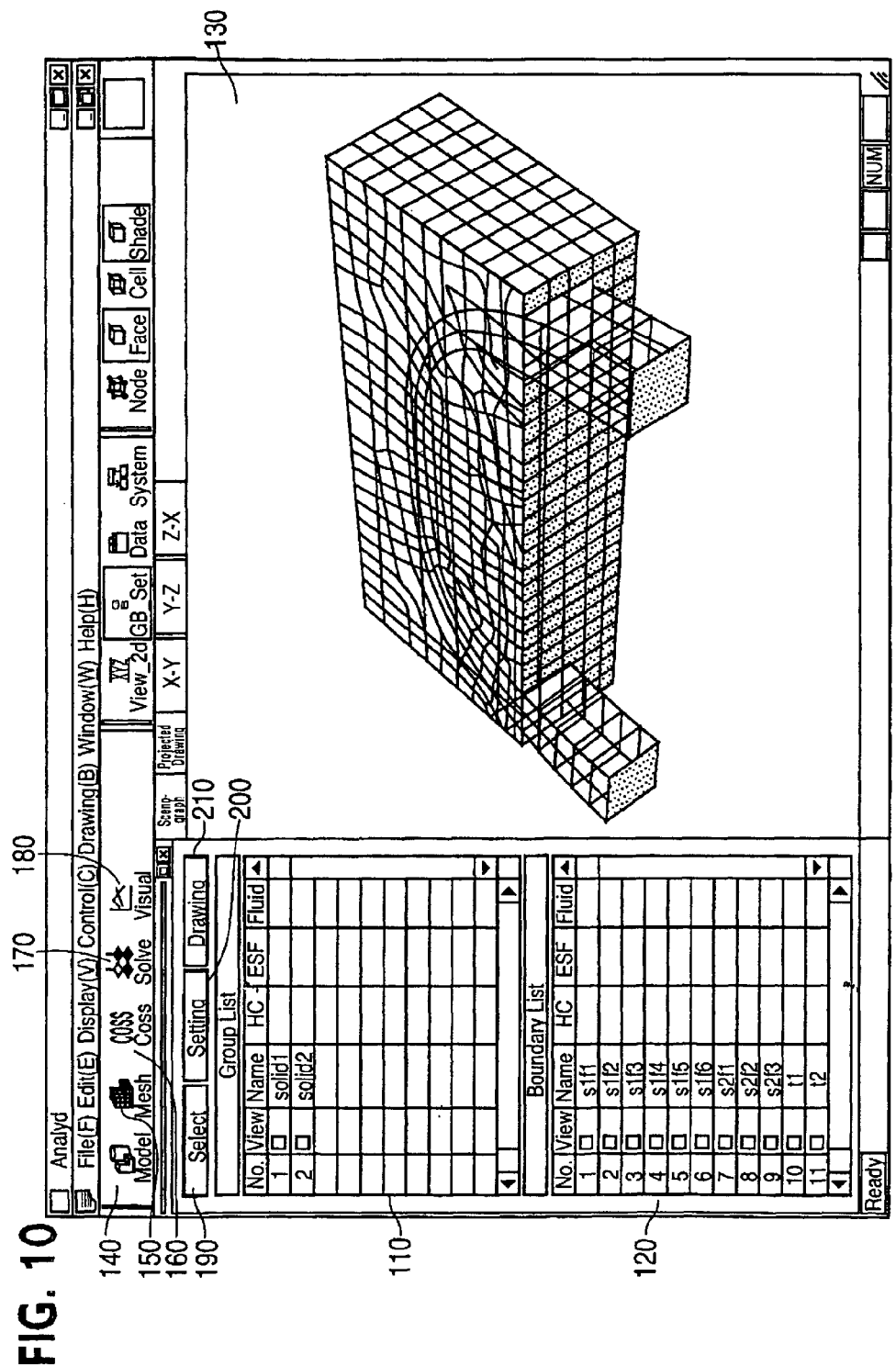
FIG. 10 is a drawing to explain the screen for setting analysis conditions in FIG. 1.

FIG. 10 is a drawing of the initial screen for setting boundary conditions. In FIG. 10, the icon 140 has the purpose of indicating the model generating process in FIG. 1; the icon 150 has the purpose of indicating the mesh generating process in FIG. 1; the icon 160 has the purpose of indicating the process for setting boundary conditions; the icon 170 has the purpose of indicating the computation process; and the icon 180 has the purpose of indicating the process for displaying results.

When the icon 160 for the process for setting analysis conditions is clicked, the form of the object model is displayed in the screen area 130 as shown in FIG. 10. The two-dimensional list 110 of the groups is displayed in the screen area 110 and the two-dimensional list 120 of boundaries is displayed in the screen area 120.

In this example, the group numbers are placed in the vertical axis of the dimensional list 110 and "View", group name, and physical model (heat conduction, electrostatic field, fluid) are placed in the horizontal axis. The object model has two groups: "solid 1" and "solid 2".

Likewise, the boundary numbers are placed in the vertical axis of the two-dimensional list 120 and "View", boundary name, and physical model (heat conduction, electrostatic field, fluid) are placed in the horizontal axis. The boundaries of the object model are shown as the boundaries "s1f 1" through "s1f 6" for the group "solid 1" and as the boundaries "s2f 1", through "s2f 3" for "solid 2".

Figure 11:
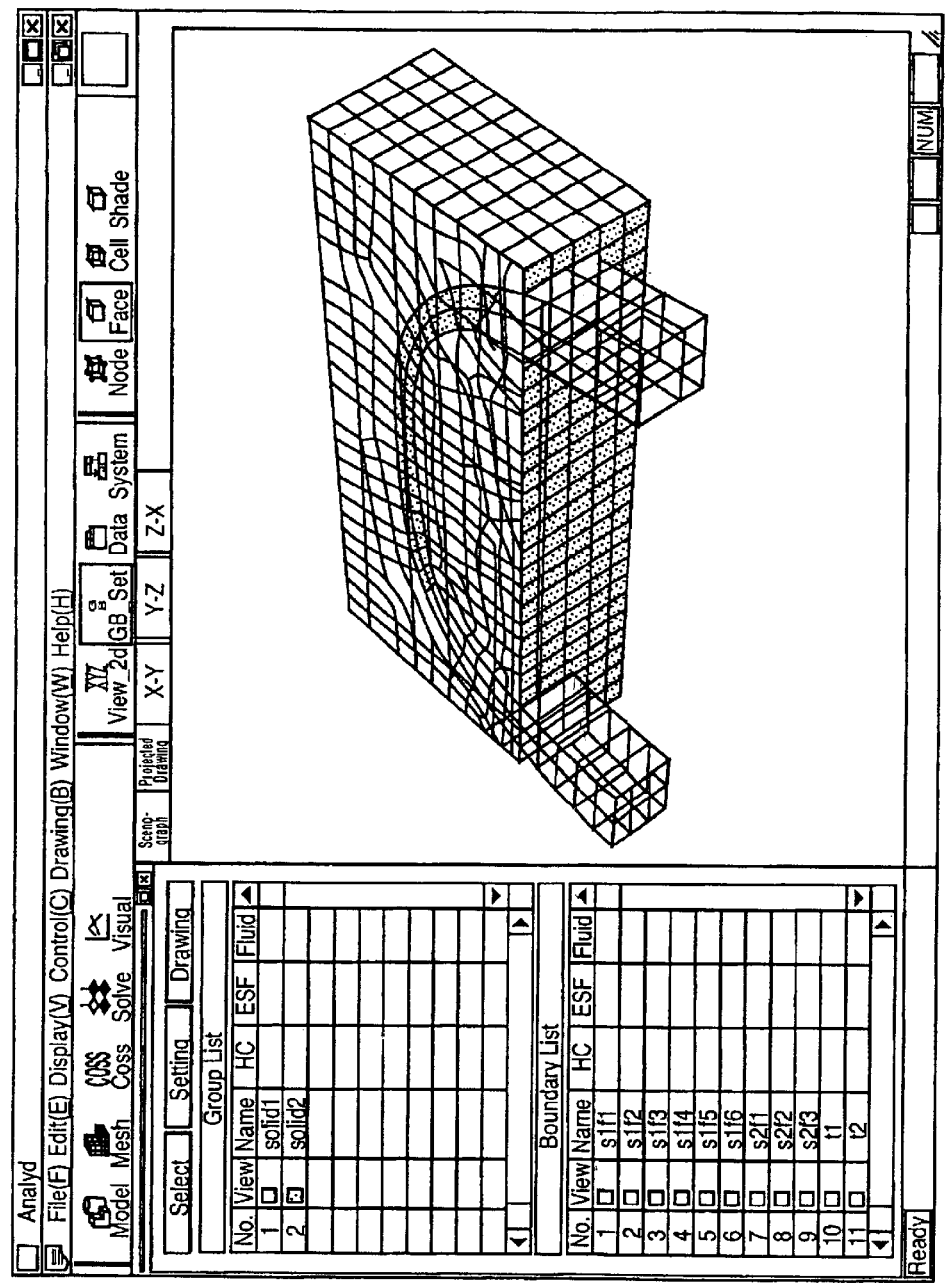
FIG. 11 is a drawing to explain the setting of an element group on the screen in FIG. 10.

The group selection process will be explained next using FIGS. 11 through 13. By clicking on the group selection mode 190 shown in FIGS. 10 and 13, group selection, meaning the physical properties of each group, is selected. The selection method is as follows: a circle (○) is displayed as shown in FIGS. 11 and 13 and the physical properties for that group name are determined by clicking (or double clicking) with the mouse at the intersecting areas in the list 110 generated with the group names and the physical models. At this time, the boundaries of the selected group are automatically checked and, as shown in FIGS. 11 and 13, the same physical properties as the group are determined. Furthermore, circles (○) are displayed in the boundary list. Also, when the area of the group list where the circle (○) is displayed is clicked (or double clicked) with the mouse, the display of the circle (○) is cancelled and the settings are deleted.

Specifically, as shown in FIG. 13, when the area A where "group" and "physical model" intersect is clicked (or double clicked) with the mouse, the boundary B of that group is automatically checked. For example, if the physical property of the group is tentatively determined to be "heat conduction", this is automatically reflected on the group list 110 and the boundary list 120 by using the way that the properties of the boundaries of that group are uniformly determined to have the property of "heat conduction" (correlation between group and boundary).

When there are a plurality of boundaries, it is difficult to know which boundary has which physical property, but the user can easily and correctly set the analysis conditions by using these group and boundary lists 110, 120.

Figure 12:
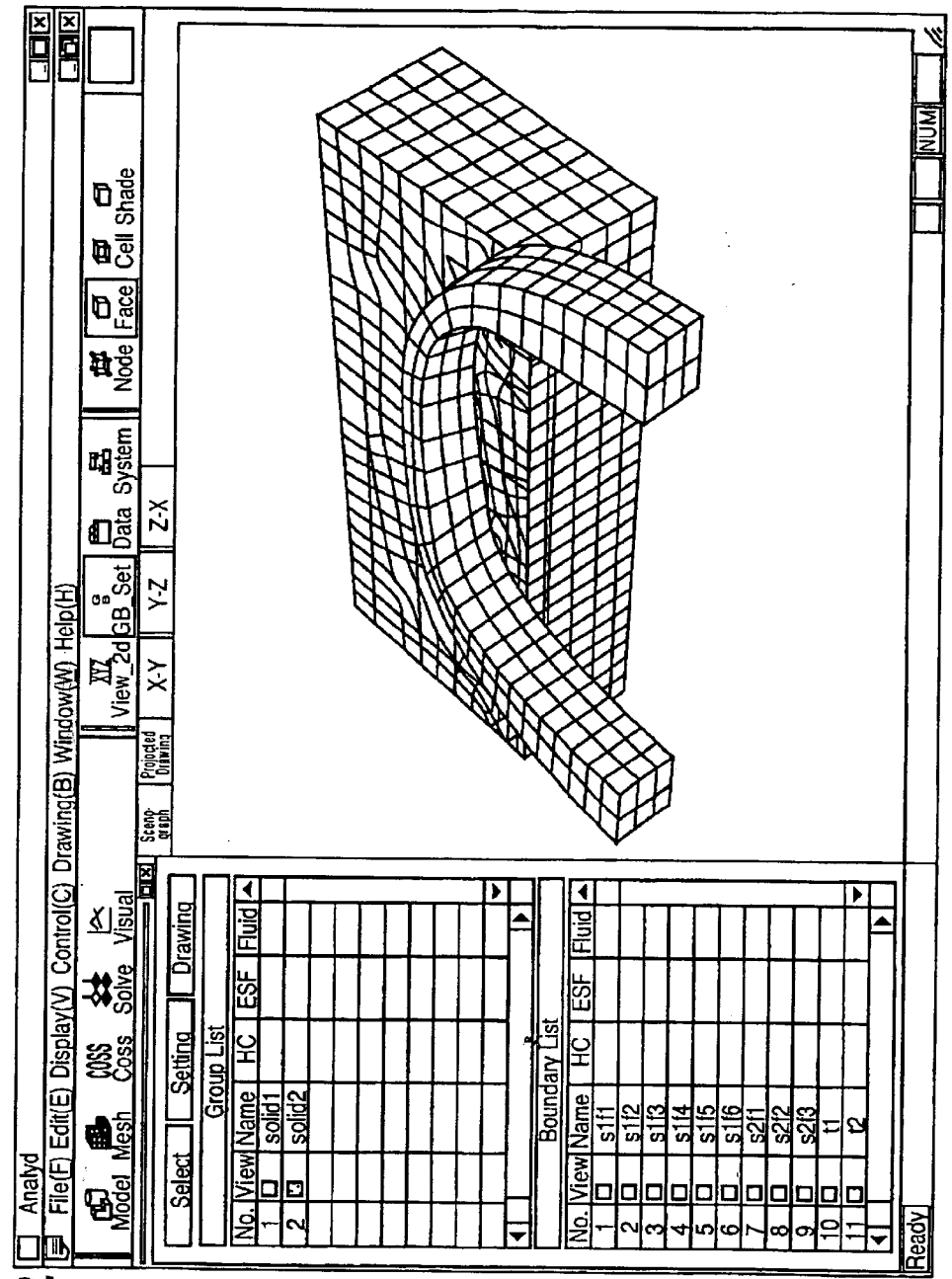
FIG. 12 is a drawing to explain the setting of another element group on the screen in FIG. 10.
Figure 13:
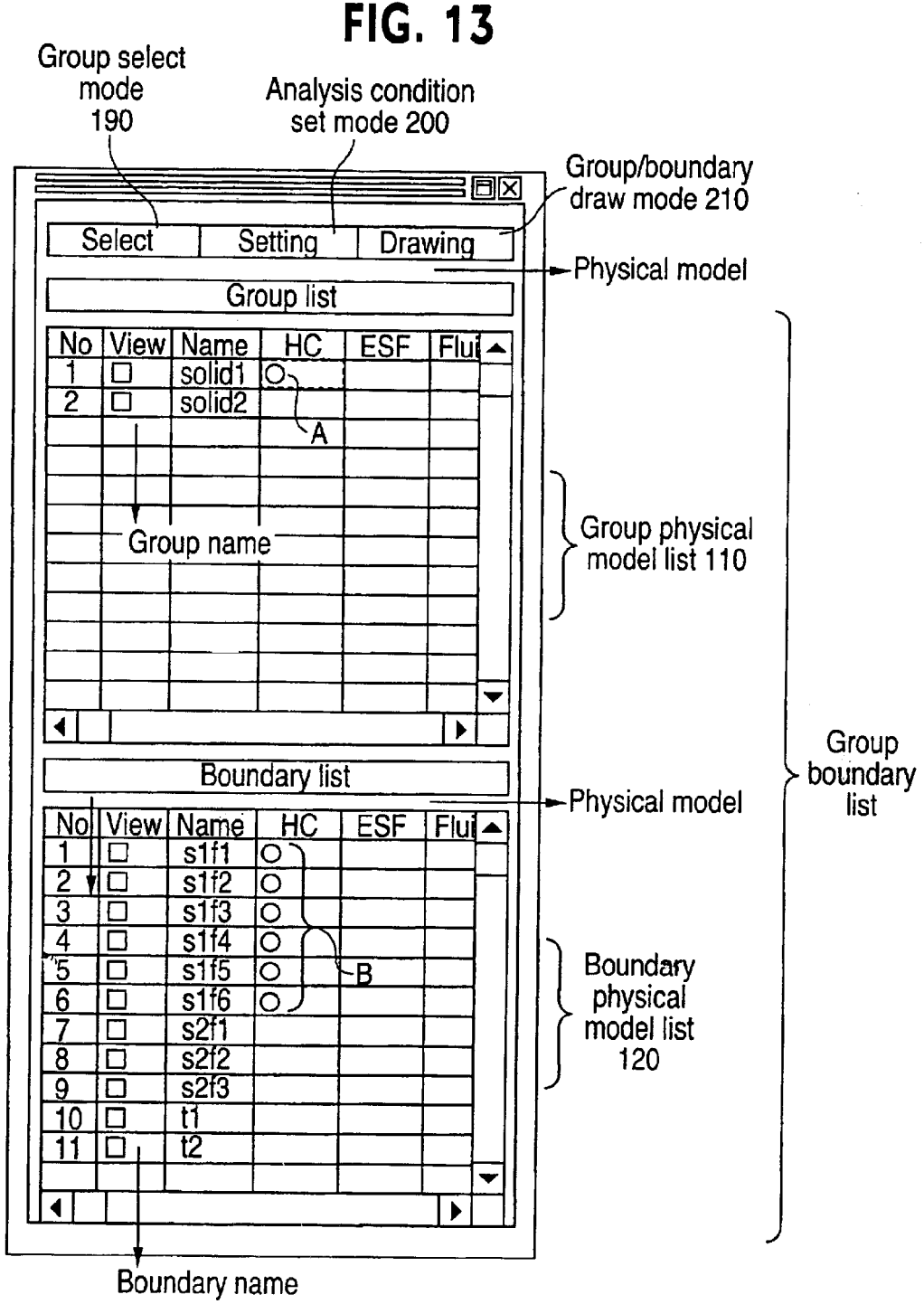
FIG. 13 is an enlarged drawing of the group and boundary list on the screen in FIG. 10.

Likewise, as shown in FIG. 12, if the physical property is tentatively determined to be "heat conduction" for the group "solid 2" as well, the properties of the boundaries of that group are uniformly determined to have the property of "heat conduction" and this is automatically reflected in the group list 110 and the boundary list 120.

Next, the process moves to the setting of analysis conditions and the setting icon 200 in FIGS. 10 and 13 is clicked. When areas displaying circles (○), selected in selection mode and for which the physical properties were determined, are clicked (or double clicked) with the mouse, the screens for setting analysis conditions corresponding to the physical properties (FIGS. 3 and 4) are displayed and the analysis conditions can be set. While the screen for setting analysis conditions is displayed (setting standby), the corresponding groups and boundaries are displayed in an intensified manner as shown in FIGS. 11 and 12.

Furthermore, so that the user can understand the progress of the setting situation at a glance, the circles (○) in the lists are changed to double circles (◎) after the analysis conditions are set. In the case where the analysis conditions for set areas as explained above are later changed and computed (for example, when the heat transmission rate is doubled), the specifics of the set areas are very easily changed.

Figure 14:
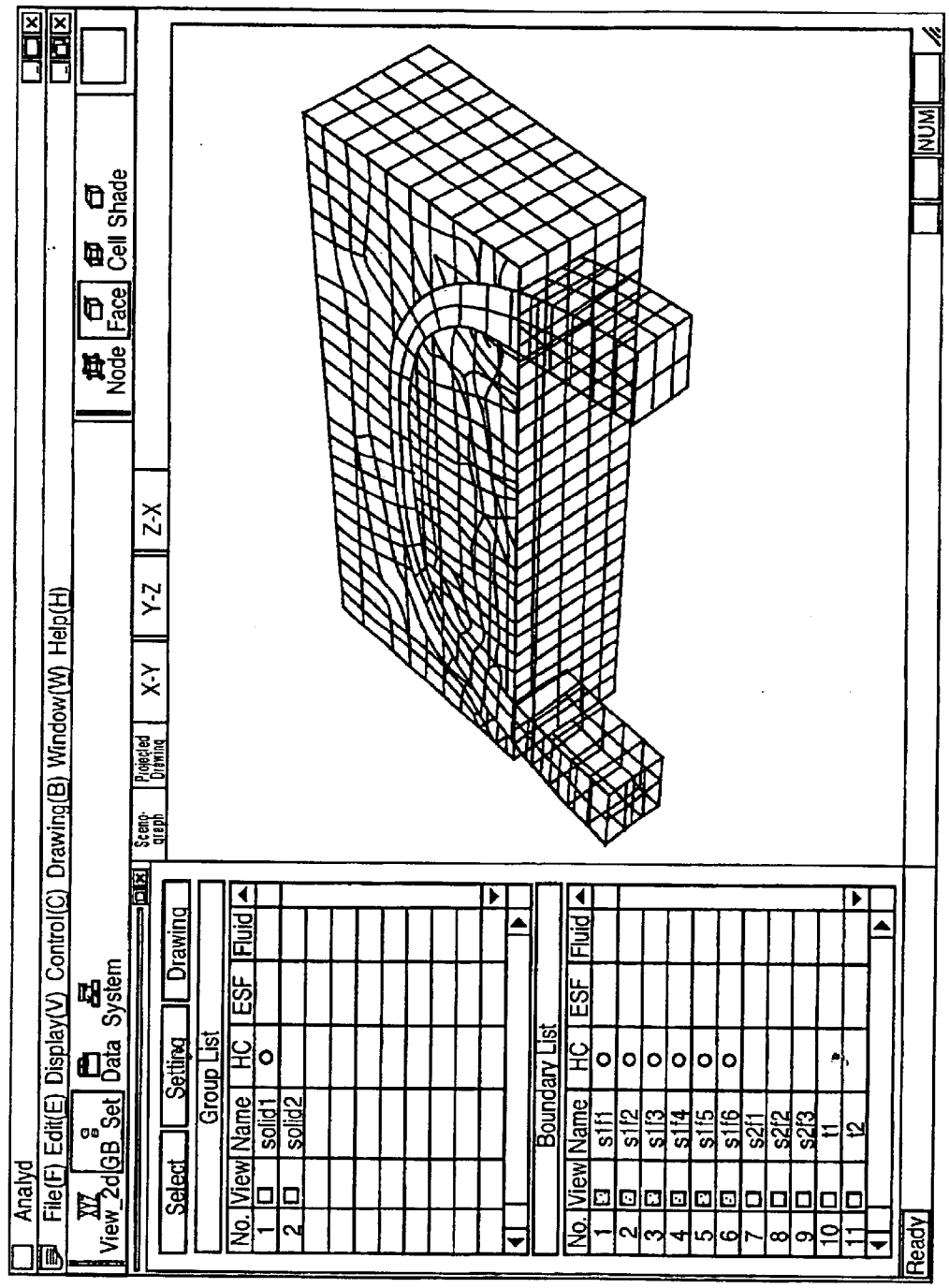
FIG. 14 is a drawing to explain the drawing of a model when an element group is set on the screen in FIG. 10.
Figure 15:
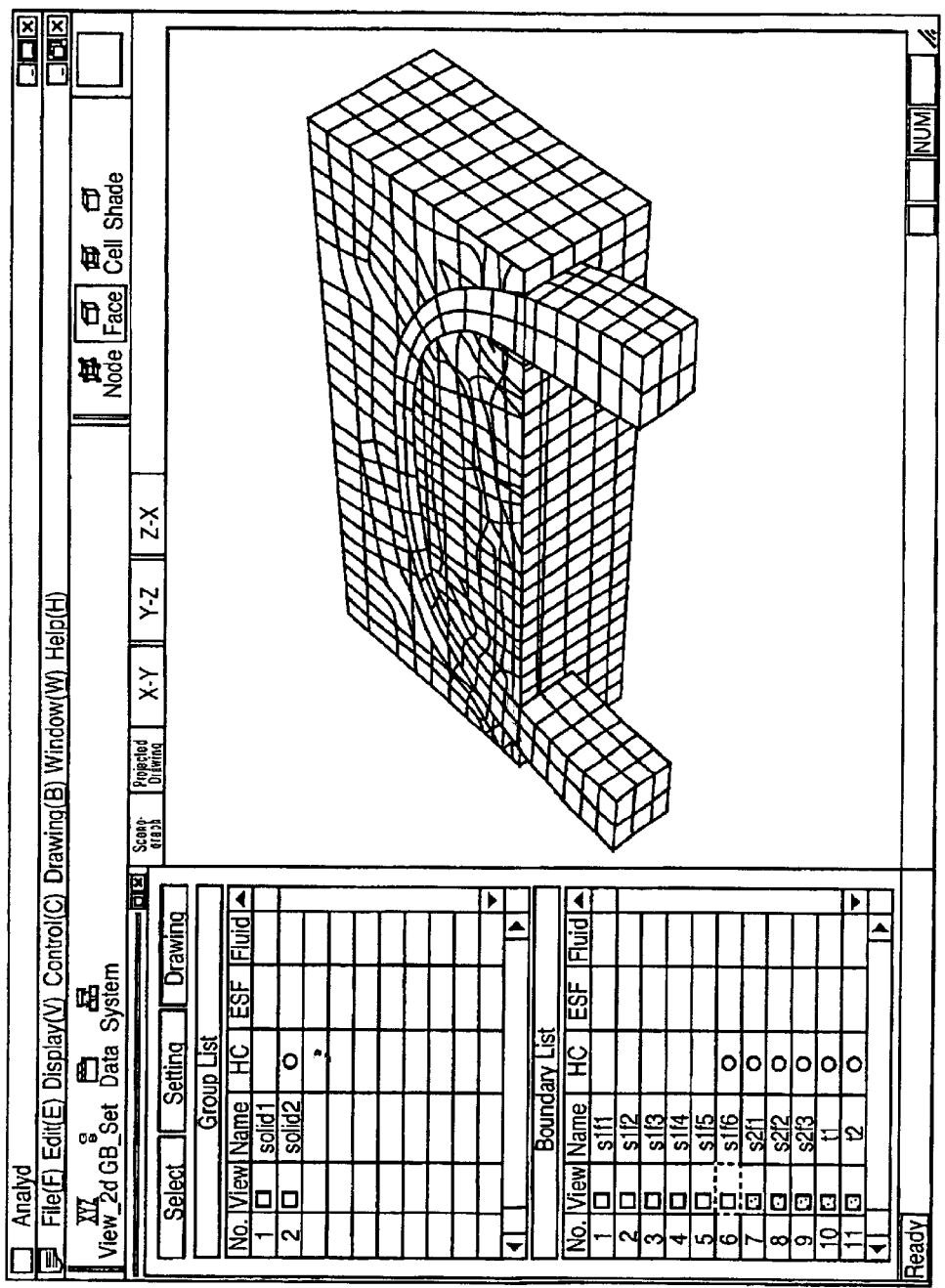
FIG. 15 is a drawing to explain the drawing of a model when the other element group is set on the screen in FIG. 10.
Figure 16:
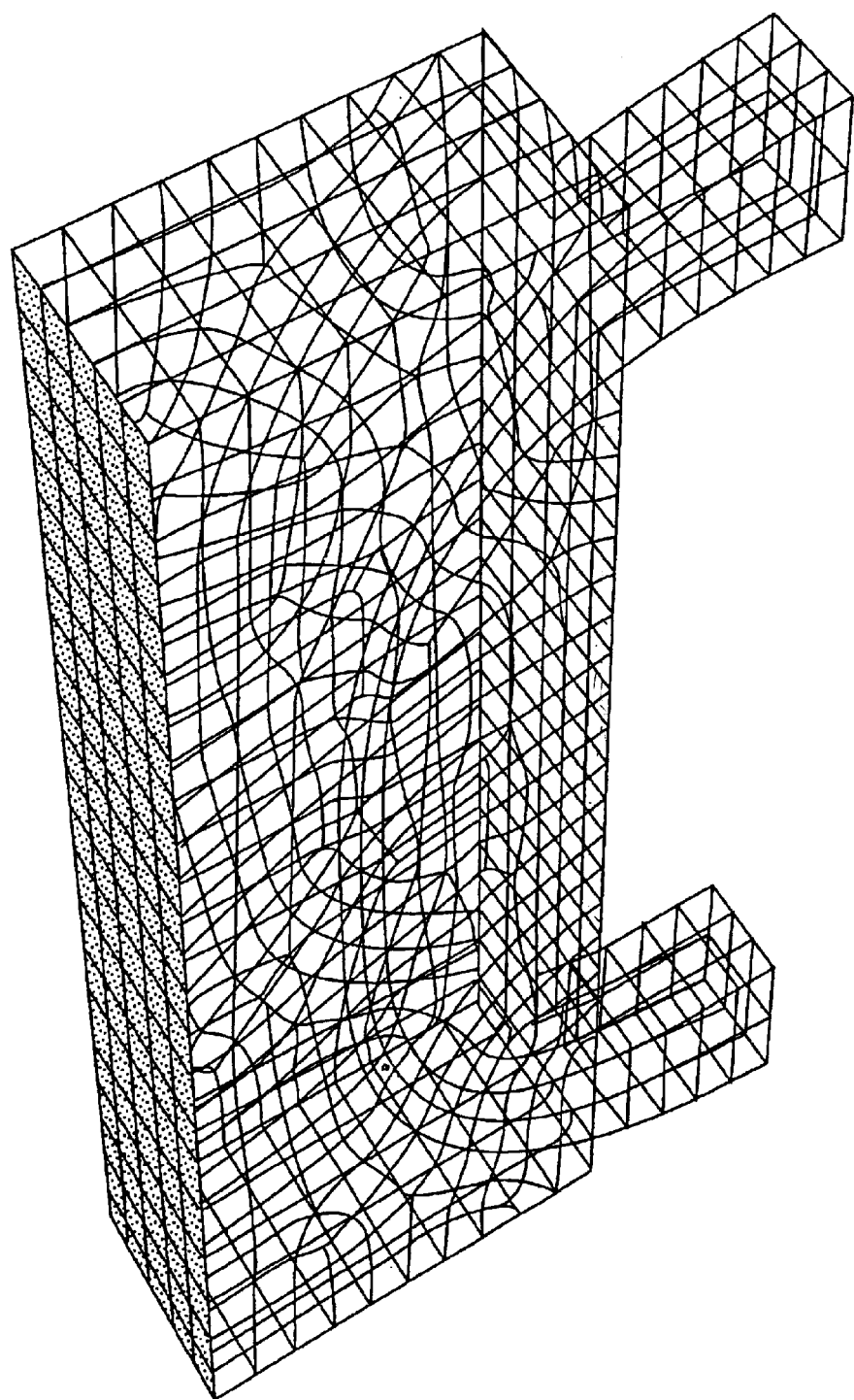
FIG. 16 is a drawing to explain the drawing of a model when a boundary is set on the screen in FIG. 10.
Figure 17:
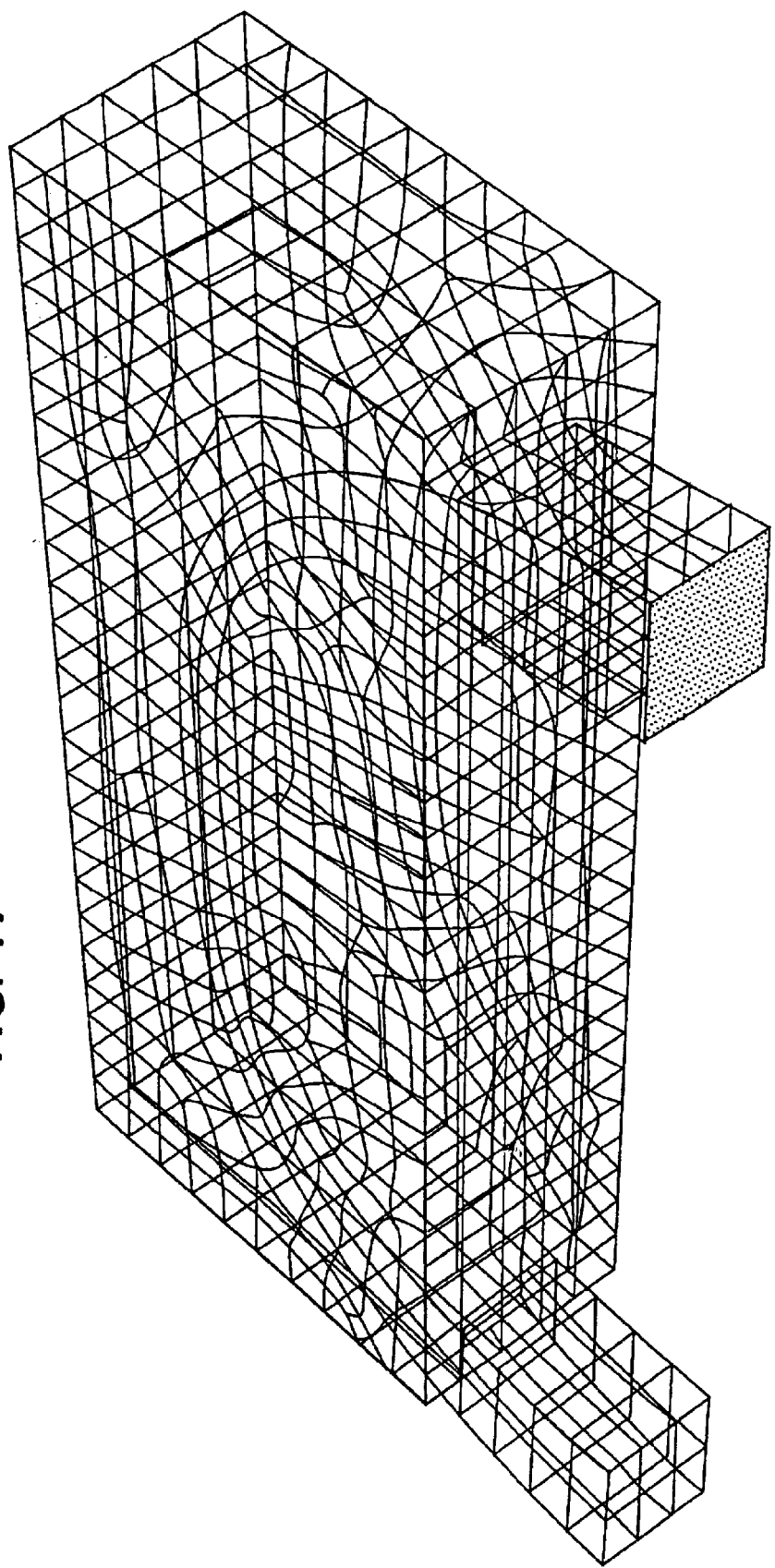
FIG. 17 is a drawing to explain the drawing of a model when another boundary is set on the screen in FIG. 10.
Figure 18:
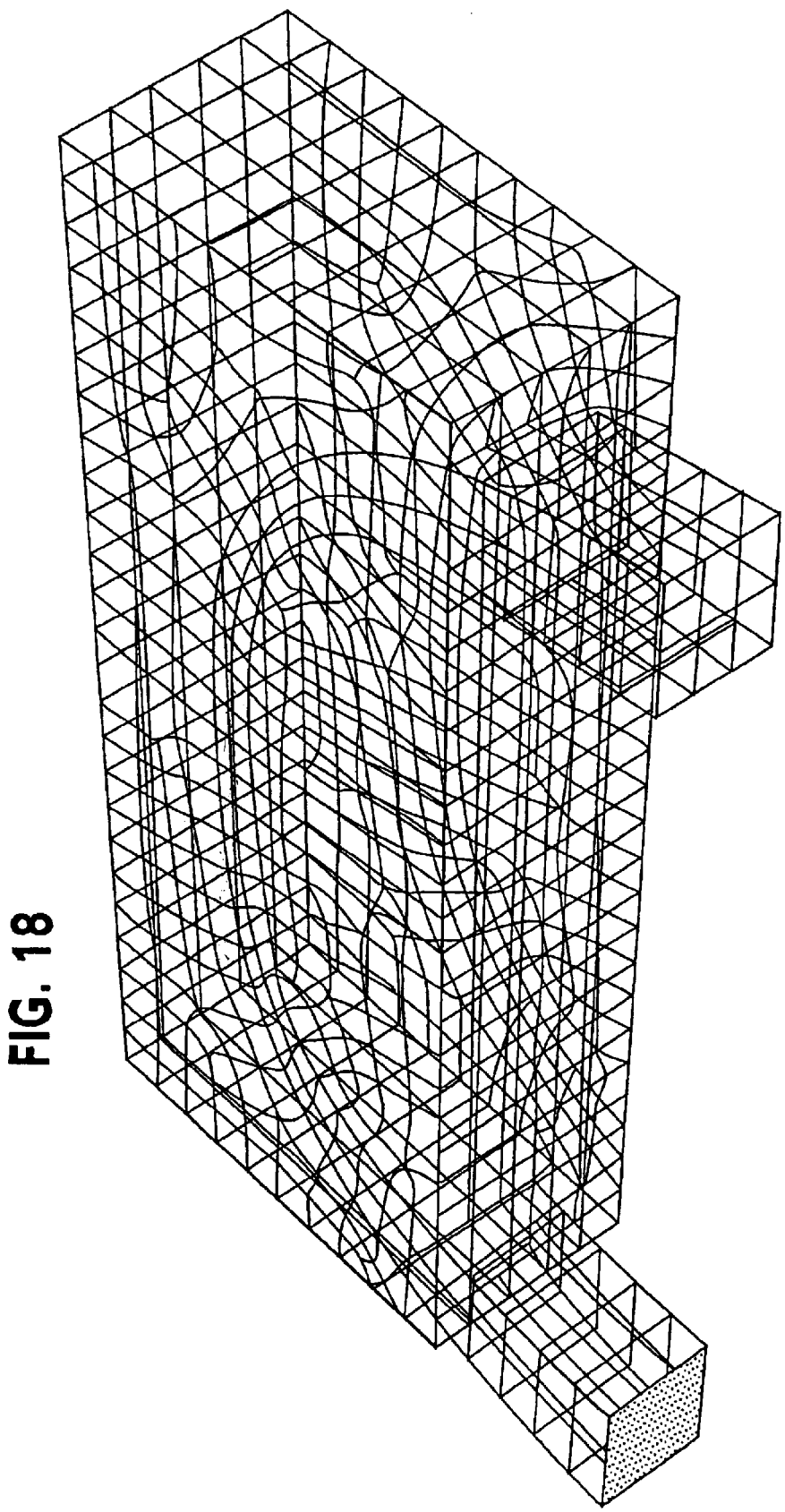
FIG. 18 is a drawing to explain the drawing of a model when another boundary is set on the screen in FIG. 10.

Furthermore, group and boundary drawing modes are also possible. As shown in FIGS. 14 and 15, the white square (□) in the "View" column in the list 110 is changed to a black square (■) when clicked and the corresponding group is then displayed in a different color or the like, for emphasis, on the screen. In the same way for boundaries, the white square (□) in the "View" column in the list 120 is changed to a black square (■) when clicked and the corresponding boundary is then displayed with a different color or the like, for emphasis, on the screen as shown in FIGS. 16 through 18.

When this emphasized area on the model drawing screen is clicked (or double clicked) with the mouse, the screen for setting analysis conditions (FIGS. 3 and 4) is displayed and it is possible to set analysis conditions. In other words, it is possible to make the settings both using the list and using the drawing screen.

In the embodiment discussed above, the group list 110 and the boundary list 120 are displayed on the screen at the same time; however it is also possible to display one and then the other with a switching operation.

Other Embodiments

FIGS. 19 and 20 are drawings to explain the variable setting screens for other embodiments of the present invention. In FIG. 19, the variable setting screen for heat conduction analysis and the variable setting screen for fluid analysis are constituted with a single setting screen 116. In this screen 116, it is possible to input the heat conduction rate, specific heat, coefficient of viscosity, mass density, and so forth.

In FIG. 20, the screen for setting boundary conditions for heat conduction analysis and screen for setting boundary conditions for fluid analysis are constituted with a single setting screen 126, with which it is possible to input heat flux, heat transmission rate, pressure, flow rate, and so forth.

Figures 21, 22:
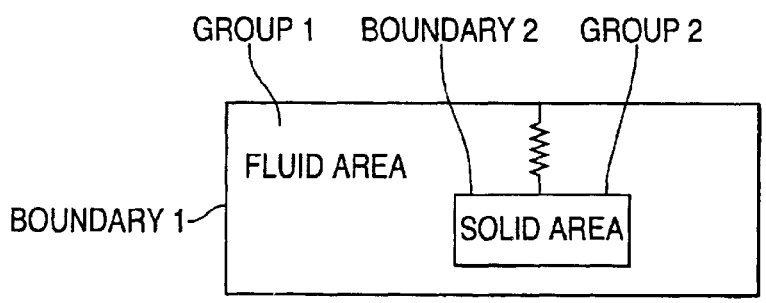
FIG. 21 is a drawing to explain the screen for setting analysis conditions that is another embodiment of the present invention.
FIG. 22 is a drawing to explain the object model that is another embodiment of the present invention.
Figures 23, 24:
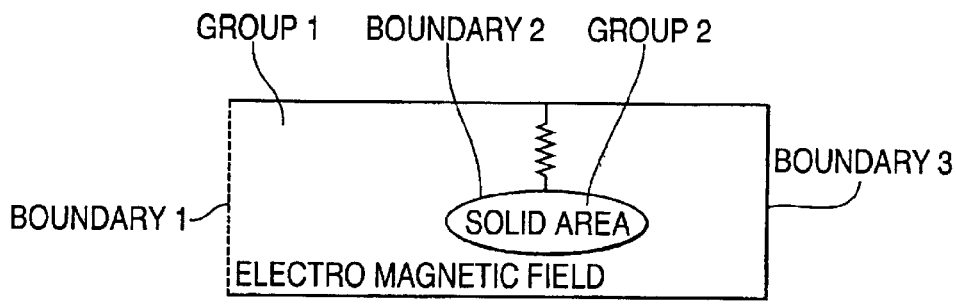
FIG. 23 is a drawing to explain the screen for setting analysis conditions that is another embodiment of the present invention.
FIG. 24 is a drawing to explain the object model that is another embodiment of the present invention.
Figures 25, 26:
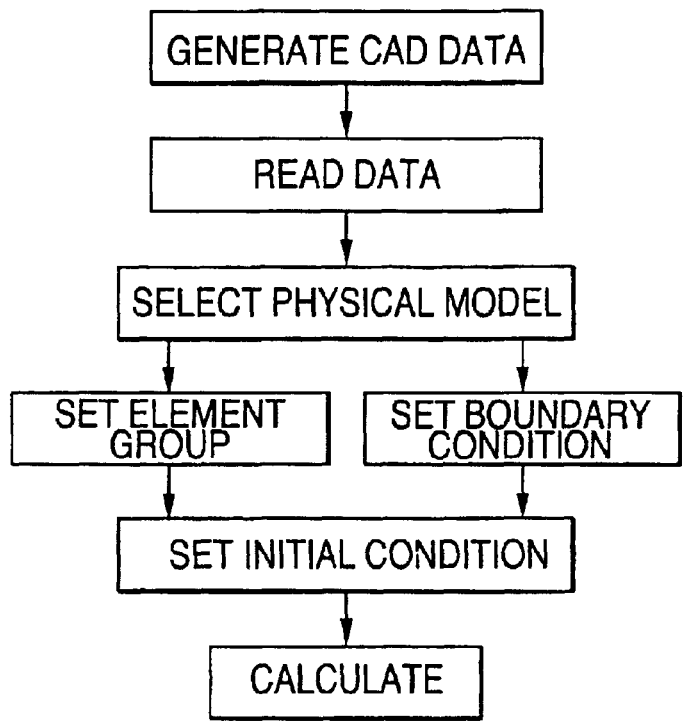
FIG. 25 is a drawing to explain the background art.
FIG. 26 is a drawing to explain a conventional screen for setting analysis conditions.
Figure 27A:
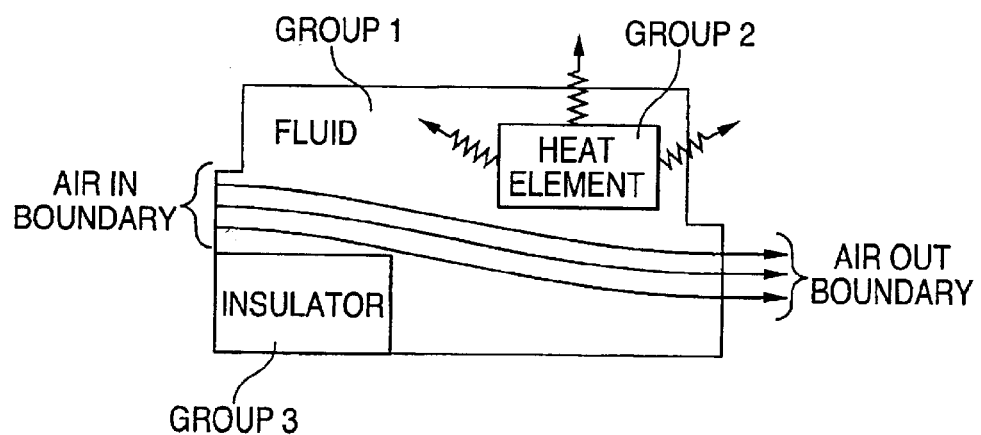
FIGS. 27A and 27B are drawings to explain an analysis object model.
Figure 27B:
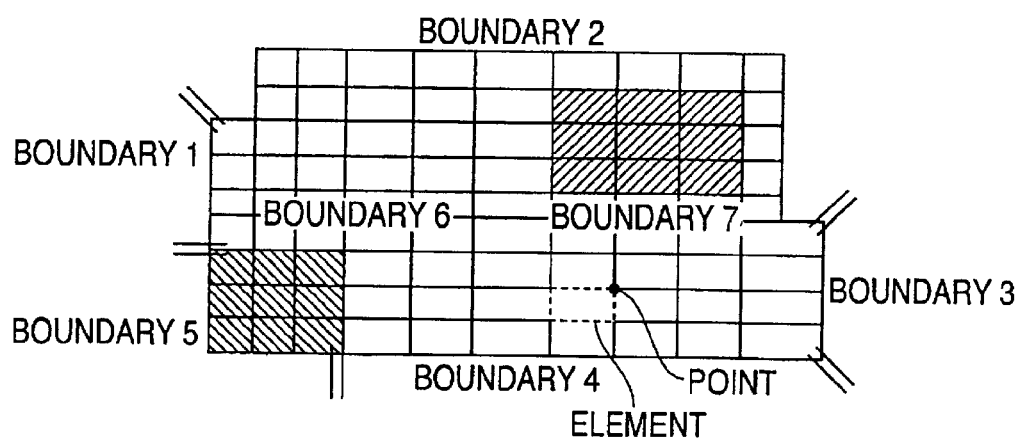

FIGS. 21 through 24 are explanatory drawings using the example of an oscillating or moving model that is another embodiment of the present invention. For a model wherein a solid (group 2) moves in a liquid (group 1) as shown in FIG. 22, or a model wherein a solid (group 2) oscillates in an electromagnetic field region (group 1) as shown in FIG. 24, it is further necessary to set the boundary movement method as an analysis condition. For example, this includes the movement of a point object, the movement of a surface object, or axial movement.

In this case, as shown in FIGS. 21, 23, and 24, moving groups and moving boundaries are indicated with a double circle, for example, in order to be distinguished from non-moving groups and non-moving boundaries so as to call up the corresponding setting screen. Groups and boundaries can thereby be distinguished and linked in moving and oscillating models as well.

The present invention is explained above using embodiments, but various modifications are possible within the scope of the present invention and these do not fall outside of the technical scope of the present invention.

Using the principle that a group and the boundaries of that group share the common properties of a physical model, the correlation between the group and the boundary are reflected on a screen for setting boundary conditions. For this reason, when the physical model of a group is set, the boundaries corresponding to that group are automatically found and the analysis conditions for those boundaries are set with a screen for setting boundary conditions. Accordingly, in the setting of analysis conditions for coupled analysis, the element groups and boundaries of an object model are automatically correlated and it becomes possible to set the analysis conditions easily and properly.

What is claimed is:

1. A multi-physics analysis method for simulating an object model with a plurality of physical simulation models, comprising:

setting the physical simulation models for element groups constituting said object model;

searching boundaries of said object model corresponding to said set element group;

reflecting the physical simulation models of said element groups to the boundaries searched on a screen for setting analysis conditions for the boundaries of said object model setting the analysis conditions for said boundaries on the screen for setting analysis conditions of said reflected boundaries; and analyzing said object model with said set physical simulation models and analysis conditions, wherein said setting the physical simulation models comprises setting the physical simulation models of said element groups on an element group set list screen displayed in common with said screen for setting analysis conditions of said boundaries.

2. The multi-physics analysis method according to claim 1, further comprising displaying the form of said object model in common with said element group set list screen.

3. The multi-physics analysis method according to claim 1, wherein said setting the physical simulation models comprises setting the physical simulation model for said element groups on said element group set list screen comprising a two-dimensional list of said element groups and said physical simulation models.

4. The multi-physics analysis method according to claim 1, wherein said reflecting comprises reflecting the physical simulation models of said element groups on the screen for setting the analysis conditions of the boundaries comprising a two-dimensional list of said boundaries and said physical simulation models.

5. The multi-physics analysis method according to claim 1, further comprising generating a correspondence list showing a relationship between the element groups and the boundaries from the element group and boundary data of said object model.

6. The multi-physics analysis method according to claim 1, further comprising generating boundary data belonging to two or fewer element groups from the element group and boundary data of said object model.

7. A method for setting analysis conditions for multi-physics analysis for simulating an object model with a plurality of physical simulation models, comprising setting the physical simulation models for element groups constituting said object model;

searching boundaries of said object model corresponding to said set element groups;

reflecting the physical simulation models of said element groups to the boundaries searched on a screen for setting analysis conditions for the boundaries of said object model; and setting the analysis conditions for said boundaries on the screen for setting analysis conditions of said reflected boundaries wherein said setting the physical simulation models comprises setting the physical simulation models of said element groups on an element group set list screen displayed in common with said screen for setting analysis conditions of said boundaries.

8. The method for setting analysis conditions for multi-physics analysis according to claim 7, further comprising displaying the form of said object model commonly with said element group set list screen.

9. The method for setting analysis conditions for multi-physics analysis according to claim 7, wherein said setting the physical simulation models comprises setting the physical simulation model for said element groups on said element group set list screen comprising a two-dimensional list of said element groups and said physical simulation models.

10. The method for setting analysis conditions for multi-physics analysis according to claim 7, wherein said reflecting comprises reflecting the physical simulation models of said element groups on the screen for setting the analysis conditions of the boundaries comprising a two-dimensional list of said boundaries and said physical simulation models.

11. The method for setting analysis conditions for multi-physics analysis according to claim 7, further comprising generating a correspondence list showing a relationship between the element groups and the boundaries from the element group and boundary data of said object model.

12. The method for setting analysis conditions for multi-physics analysis according to claim 7, further comprising generating boundary data belonging to two or fewer element groups from the element group and boundary data of said object model.

13. A storage medium storing computer readable and executable instructions which when executed by the computer perform a process for setting analysis conditions for multi-physics analysis for simulating an object model with a plurality of physical simulation models, the process comprising setting the physical simulation models for element groups constituting said object model;

searching boundaries of said object model corresponding to said set element groups;

reflecting the physical simulation models of said element groups to the boundaries searched on a screen for setting analysis conditions for the boundaries of said object model; and setting the analysis conditions for said boundaries on the screen for setting analysis conditions of said reflected boundaries wherein said setting of the physical simulation models comprises setting the physical simulation models for said element groups on an element group set list screen that is displayed in common with said screen for setting analysis conditions of said boundaries.

* * * * *

UNITED STATES PATENT AND TRADEMARK OFFICE
CERTIFICATE OF CORRECTION

| | |
|---|---|
| PATENT NO. | : 6,954,725 B2 |
| APPLICATION NO. | : 09/864187 |
| DATED | : October 11, 2005 |
| INVENTOR(S) | : Koichi Shimizu |

It is certified that error appears in the above-identified patent and that said Letters Patent is hereby corrected as shown below:

<u>Column 11,</u>
Line 17, after "model" insert -- ; --.
Line 54, after "comprising" insert -- : --.

<u>Column 12,</u>
Lines 3 and 53, after "boundaries" insert -- , --.
Line 42, after "comprising" insert -- : --.

Signed and Sealed this

Twenty-seventh Day of June, 2006

JON W. DUDAS
*Director of the United States Patent and Trademark Office*